United States Patent
Cobb, Jr.

(10) Patent No.: US 7,707,728 B2
(45) Date of Patent: May 4, 2010

(54) ENGAGEMENT SYSTEM FOR CONNECTING GARDENING TOOLS AND SIMILAR TO A POWER UNIT

(75) Inventor: William T Cobb, Jr., St. Petersburg, FL (US)

(73) Assignee: EMAK S.p.A., Bagnolo In Piano (Reggion Emilia) (IT)

( * ) Notice: Subject to any disclaimer, the term of this patent is extended or adjusted under 35 U.S.C. 154(b) by 871 days.

(21) Appl. No.: 11/430,951

(22) Filed: May 10, 2006

(65) Prior Publication Data
US 2006/0284048 A1    Dec. 21, 2006

(30) Foreign Application Priority Data
May 17, 2005    (IT)    ............... RE2005A0054

(51) Int. Cl.
B26B 27/00    (2006.01)
B25G 3/12    (2006.01)
(52) U.S. Cl. ................... 30/296.1; 403/325
(58) Field of Classification Search ............ 172/15–22; 56/12.7; 30/122, 276, 296.1; 403/321, 325, 403/322.4
See application file for complete search history.

(56) References Cited

U.S. PATENT DOCUMENTS

| | | | |
|---|---|---|---|
| 3,682,283 A | | 8/1972 | Sato |
| 4,505,040 A | * | 3/1985 | Everts ...................... 30/296.1 |
| 5,802,724 A | * | 9/1998 | Rickard et al. ............. 30/296.1 |
| 5,819,418 A | * | 10/1998 | Uhl ........................... 30/296.1 |
| 5,867,910 A | * | 2/1999 | Stegall et al. ............... 30/272.1 |
| 6,006,434 A | * | 12/1999 | Templeton et al. ......... 30/296.1 |
| 6,305,867 B1 | | 10/2001 | Schweigert et al. |
| 6,345,489 B1 | * | 2/2002 | Everts et al. ................. 56/12.7 |
| 6,997,633 B2 | * | 2/2006 | Thomas et al. ........... 403/109.6 |

FOREIGN PATENT DOCUMENTS

| | | |
|---|---|---|
| DE | 10313675 A1 | 10/2004 |
| EP | 0195146 A | 9/1986 |
| GB | 756057 A | 8/1956 |

* cited by examiner

Primary Examiner—Robert E Pezzuto
(74) Attorney, Agent, or Firm—Browdy and Neimark, PLLC

(57) ABSTRACT

An engagement system for removably connecting gardening tools and similar type devices to a power unit comprising a drive motor, the system comprising a base element suitable for being fixed to a crankcase housing the drive motor, a fastening element of a tool that can be actuated by a shaft of the drive motor, suitable for coupling with the base element, a button mounted on the base element and suitable for cooperating with a corresponding opening formed on the fastening element to removably lock the elements in an engagement position, the base element being equipped with at least one electrical safety switch actuated elastically by a rod between a first position in which the electrical safety switch is closed and prevents the operation of the drive motor, and a second position in which the electrical safety switch is open and allows the operation of the drive motor, the second position only being obtainable when the fastening element is engaged with the base element.

14 Claims, 4 Drawing Sheets

ENGAGEMENT SYSTEM FOR CONNECTING GARDENING TOOLS AND SIMILAR TO A POWER UNIT

TECHNICAL FIELD

The present invention refers to an engagement system for connecting gardening tools and similar to a power unit comprising, for example, an internal combustion engine. More specifically, the present invention refers to an engagement system that allows the connection of interchangeable tools, which can be actuated by the same power unit.

BACKGROUND OF THE INVENTION

As known, in the field of gardening the use of motorized devices that allow the use of various interchangeable implements that are to be fixed through engagement systems to a power unit comprising a motor housed in a housing crankcase is increasingly common.

The structure of engagement systems of conventional motorized devices is, however, relatively complicated and also exposes the user to dangers deriving above all from the motor being accidentally switched on during replacement of the implement.

Indeed, in systems of the prior art the means actuated by the motor, like for example the drive shaft, are often directly accessible during replacement of the implement. Currently, the market requires that such systems be as easy to use and as safe for the user as possible.

DISCLOSURE OF THE INVENTION

The purpose of the present invention is that of avoiding the aforementioned drawbacks with reference to the prior art providing an engagement system for connecting gardening tools and similar to a power unit, which is easy to use and which ensures greater safety for the user, so as to satisfy the aforementioned requirements. Such a purpose is accomplished through an engagement system for connecting gardening tools and similar to a power unit in accordance with claim 1.

The dependent claims outline preferred and particularly advantageous embodiments of the engagement system for connecting gardening tools and similar to a power unit according to the invention.

BRIEF DESCRIPTIONS OF THE DRAWINGS

Further characteristics and advantages of the invention shall become clear from reading the following description provided as an example and not for limiting purposes, with the help of the figures illustrated in the attached tables, in which.

BEST MODE FOR CARRYING OUT THE INVENTION

Figure 1:
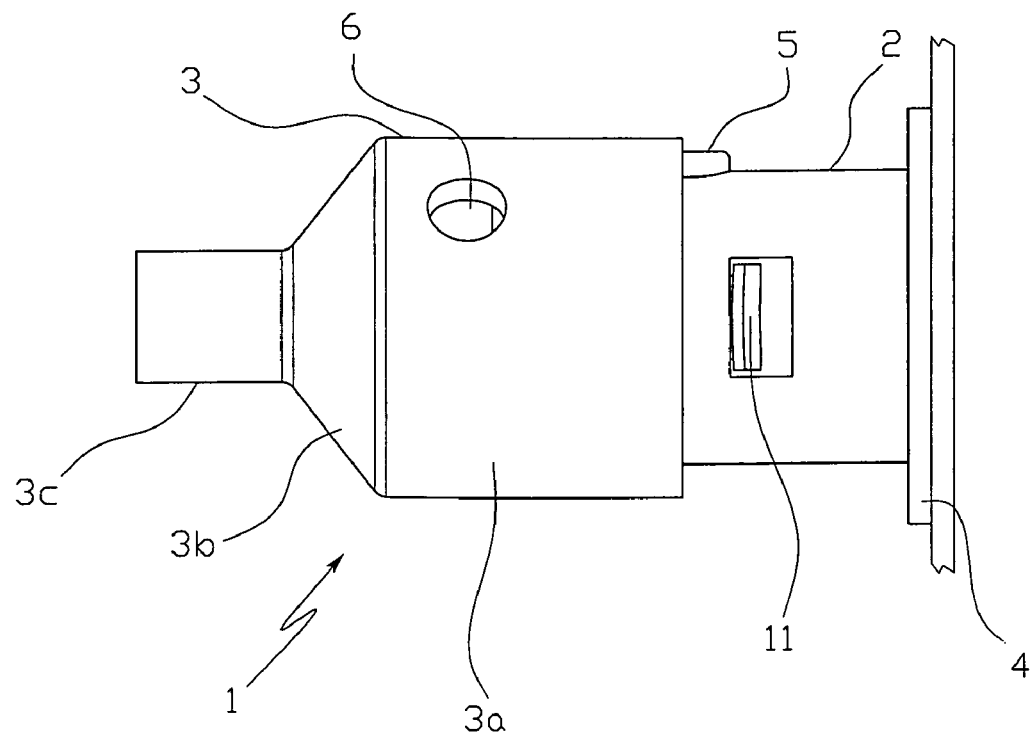
FIG. 1 shows a front view of the engagement system in accordance with the present invention.
Figure 2:
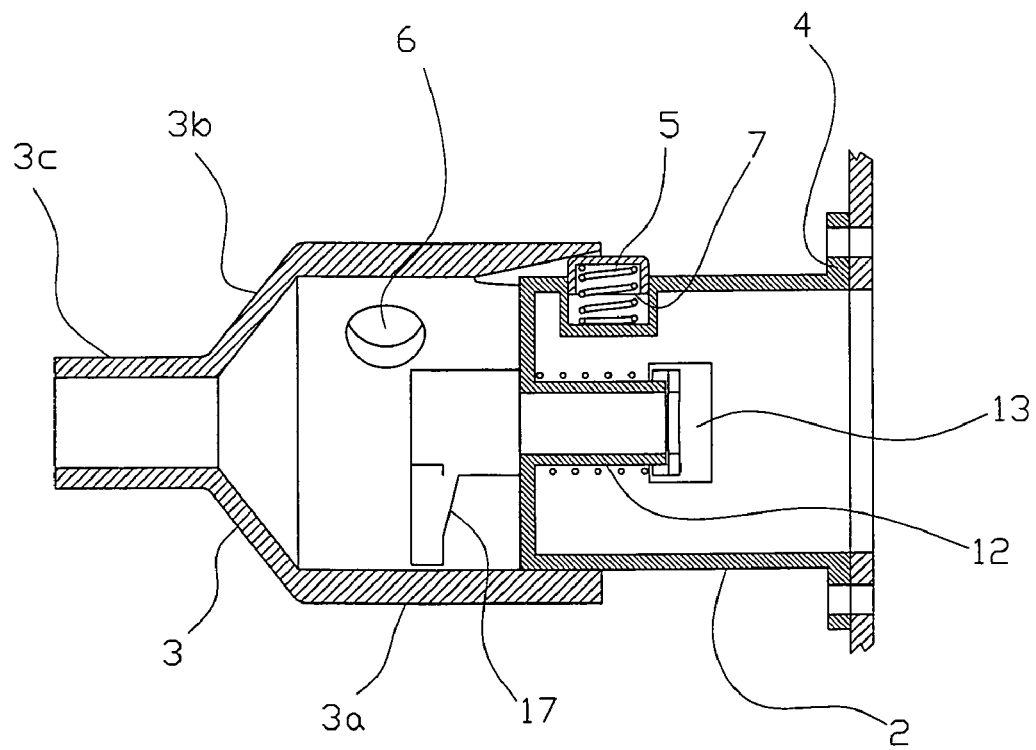
FIG. 2 shows a section view along a vertical plane of the system of FIG. 1.

With reference to FIGS. 1 and 2, an engagement system for connecting gardening tools and similar to a motor in accordance with the present invention is globally indicated with 1.

The engagement system 1 essentially comprises a base element 2 suitable for being fixed to a crankcase housing a drive motor (not illustrated) and a fastening element 3 for a tool, in which the fastening element 3 is suitable for coupling with the base element 2 clamping onto it.

In the illustrated example, the base element 2 is in the form of a male hollow cylindrical body equipped with a flange 4 for attachment to the crankcase, whereas the fastening element 3 is in the form of a female body having a cylindrical portion 3a shaped to fit onto the base body 2 and a frusto-conical portion 3b with a cylindrical portion 3c on top from where the fastening of the tool (not illustrated) takes place.

In accordance with the present invention, the elements 2 and 3 are shaped so as to make the rotary components of the motor inaccessible when they are coupled together. Alternatively, it is possible to foresee the use of a base body 2 formed integrally with the crankcase as well as a fastening body 3 formed integrally with the corresponding tool.

The base body 2 comprises a button 5 suitable for cooperating with a corresponding opening 6, formed on the fastening body 3 and shaped to receive it so that it fits to size under the thrusting of a spring.

Figure 3:
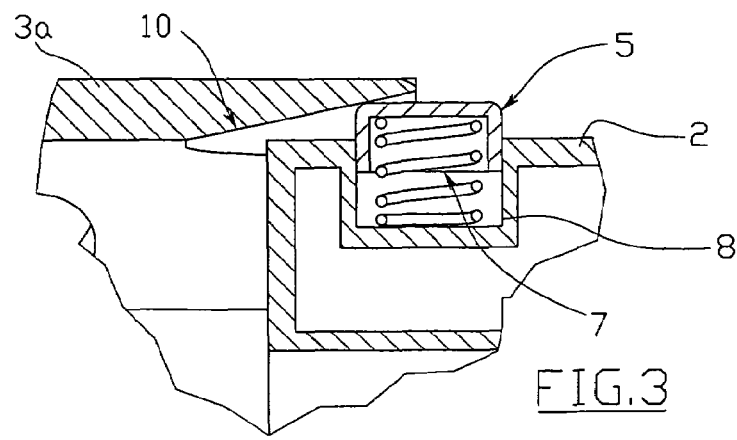
FIG. 3 shows an enlargement of a detail of FIG. 2.
Figure 4A:
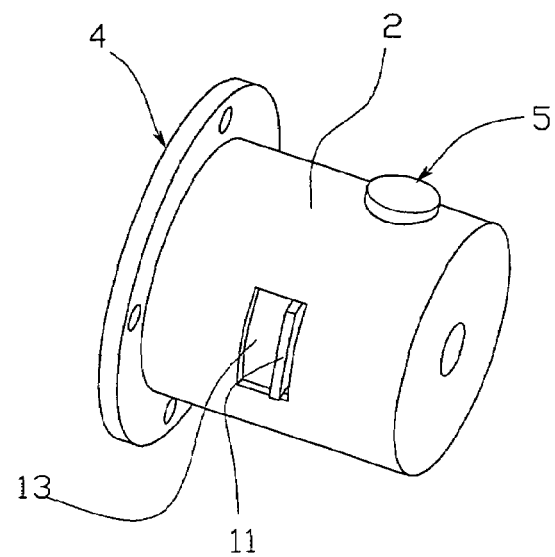
FIGS. 4A and 4B show the base element of the system of FIG. 1 according to two embodiments.
Figure 4B:
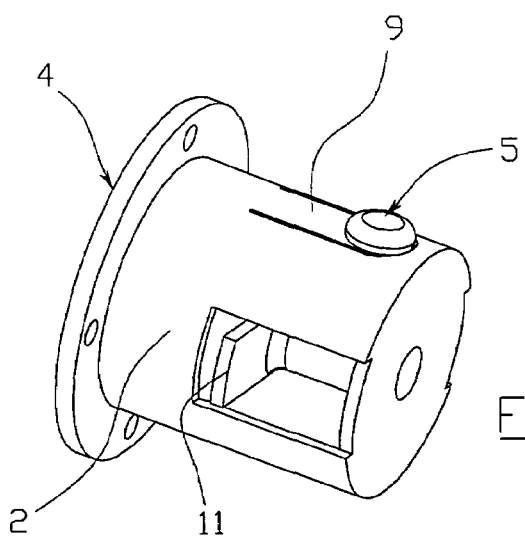

Said spring, according to a first embodiment (FIGS. 3, 4A), is in the form of a coil spring 7 housed in a space 8, formed in the base body 2, so as to exert a radial thrust outwards. In a second embodiment, said spring can be formed from an elastic portion 9 (FIG. 4B) that extends axially on the surface of the base body 2.

The spring 7 or 9 exerts a radial thrust outwards so that when the button 5 is inserted into the hole 6 it prevents the fastening body 3 from rotating. Moreover, the button 5, when it is inserted in the corresponding hole 6, locks the system 1 in the use position unequivocally determined by the mutual position between the button 5 and the hole 6.

In the illustrated example, the spring 7 or 9 is automatically preloaded during the insertion of the base body 2 into the fastening body 3. Indeed, a draft 10 is foreseen (FIG. 3) formed inside the fastening body 3 to receive the button 5 that gradually presses it inwards during insertion into the fastening body 3. The draft 10 is circumferentially staggered with respect to the hole 6, so that once the body 3 is inserted, it is rotated until the button 5 reaches the hole 6 where the spring 7 or 9 pushes it back outwards.

The base body 2 comprises a rod 11 (FIGS. 5 and 6), centrally perforated to allow the passage of the guide shaft of the tool, which is flexible and flat, fixed on the inside to the base body 2 through a hollow small cylinder 12, arranged centrally. The rod 11 is perpendicular to the axis of the small cylinder 12, and has the two opposite ends slightly projecting from the surface of the base body 2 through two opposite openings 13. Said rod 11 can be rigid, with the possibility to translate according to the axis of the base body 2 and associated with it by elastic means.

Figure 5A:
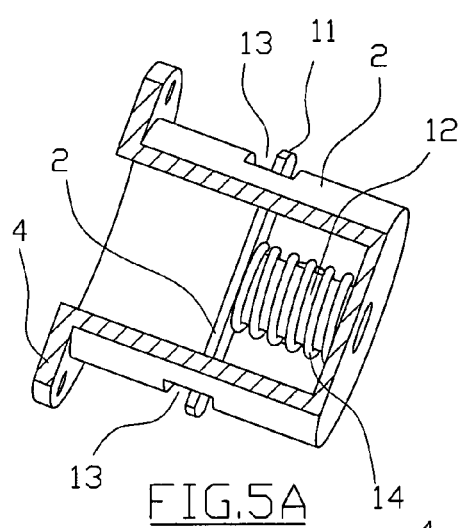
FIGS. 5A, 5B and 5C show the base element in section for the view inside an elastic element according to three embodiments.
Figure 5B:
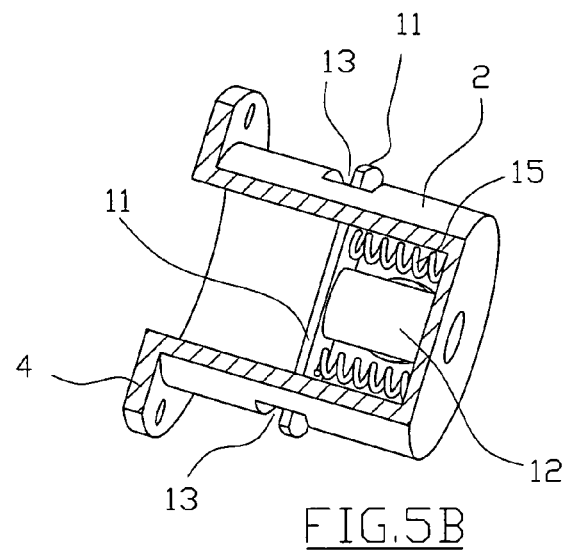
Figure 5C:
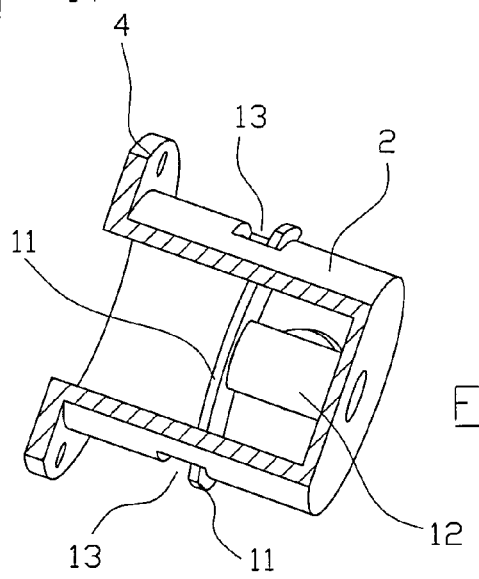

The elastic means can take up different embodiments; the preferred ones are illustrated in FIGS. 5A-5C. In particular, the elastic means can be a coil spring 14, arranged surrounding the small cylinder 12 for carrying the rod 11 (FIG. 5A), or else a pair of coil springs 15 arranged beside the small cylinder 12 (FIG. 5B). Alternatively, it is possible to foresee the use of a rod 11 consisting of a leaf spring (FIG. 5C).

Figure 6A:
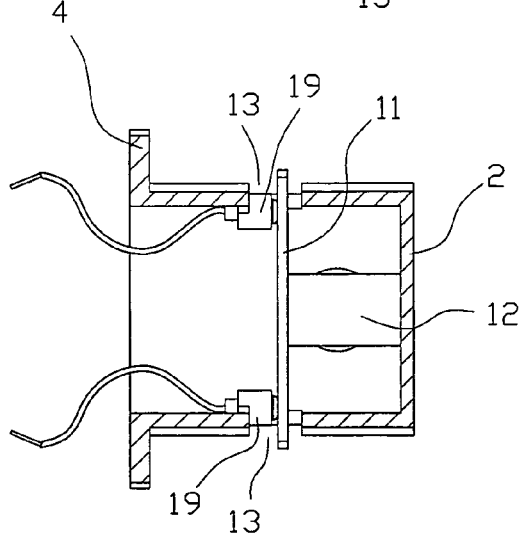
FIGS. 6A and 6B show a section view along a vertical plane of the switch associated with the base element respectively closing and opening a circuit connected to earth.

In the illustrated examples, said elastic element 14, 15 is loaded through a relative rotation of the fastening body 3 with respect to the base body 2. This loading is preferably obtained through a ramp 17 (FIG. 2) formed inside the fastening body 3 that guides the projecting ends of the rod 11 associated with the base body 2 against two switches 19 (FIGS. 6A, 6B).

Figure 6B:
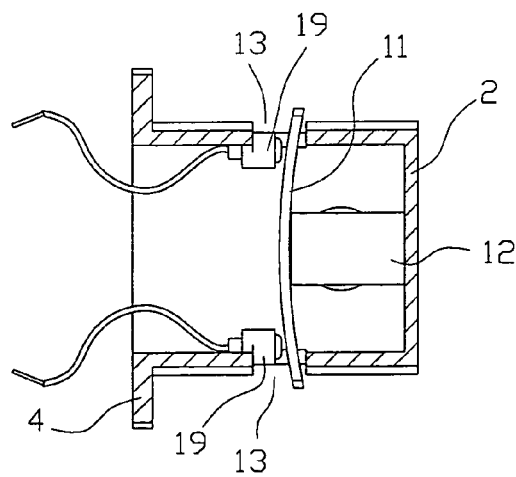

In the clamping position, not illustrated for the sake of simplicity, i.e. when the ends of the rod 11 are forced by the ramp 17 and the button 5 is inserted in the hole 6, the rod 11 is loaded elastically against the elastic elements 14, 15 (FIG. 6B).

The two electrical switches 19 form part of a circuit, for the sake of simplicity schematised in the figures with just the two electrical connection cables, which connects the circuit for switching on the motor to earth. In the illustrated example, the two switches 19 are fixed to the base body 2 near to the two openings 13. Said switches 19 are arranged so as to be actuated open by the rod 11 so as to open the earth circuit and allow the operation of the motor (FIG. 6B). In the case of detachment, possibly accidentally, of the fastening body 3, the switches 19 close and stop the motor (FIG. 6A). is always occurs when the fastening body 3 is separated from the base body 2, i.e. when the elastic element 14, 15 (or the rod 11 if it is a leaf spring) is not loaded. On the other hand, when the fastening body 3 is clamped to the base element 2, the ends of the rod 11 engage against the ramp 17 bending, against the action of the elastic element 14, 15, and moving away from the switches 19 so as to open the safety circuit and allowing the operation of the motor (FIG. 6B).

Figure 7:
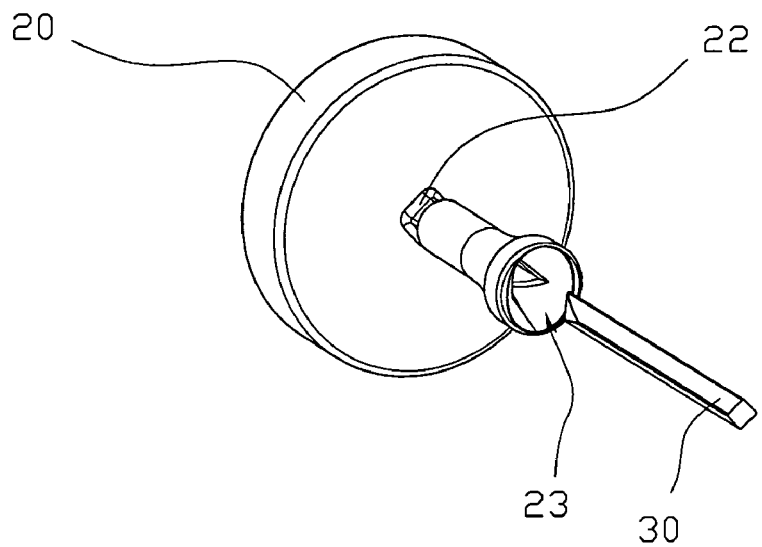
FIG. 7 shows a perspective view of a fastening system associated with the system of FIG. 1.
Figure 8:
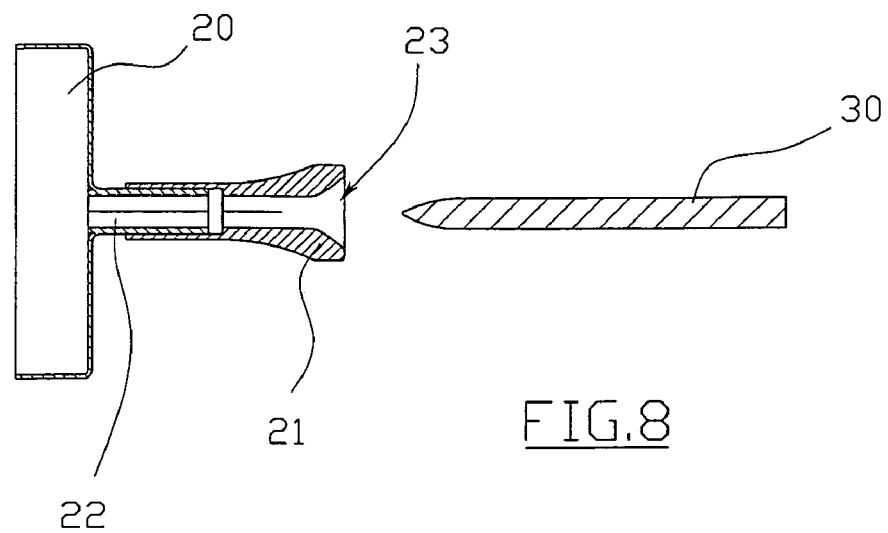
FIG. 8 shows a section view of FIG. 7 taken along a plane of symmetry.
Figure 9:
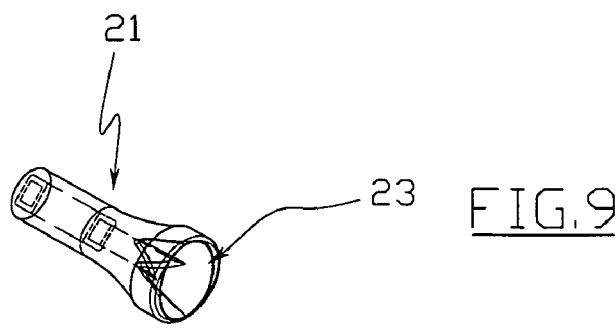
FIG. 9 shows a perspective view of an element of FIG. 7.

The engagement system 1 of the present invention can furthermore be provided with a coupling system (FIGS. 7, 8) arranged between the guide shaft 30 of the tool and the drive shaft. Said coupling system comprises an engagement cover 20 made to rotate by the drive shaft through a friction engagement and a hollow connector 21 associated with a square tang 22 formed on the centre of the cover 20. The free end of the connector 21 has a shaped receiving seat 23 having tapered curves that converge towards a square opening for coupling with the tang 22 of the cover 20 (FIG. 9). This particular configuration of the receiving seat allows easy insertion of the guide shaft 30 of the tool, which has the free coupling end shaped like a wedge.

The cover 20 is arranged inside the crankcase near and coaxial to the base element 2, with the connector 21 that extends inside the small cylinder 12.

As can be appreciated from what has been described, the engagement system for connecting gardening tools and similar to a power unit according to the present invention allows the requirements to be satisfied and allows the drawbacks mentioned in the introductory part of the present description with reference to the prior art to be overcome.

The engagement system of the present invention is simple to use. Indeed, through a simple pressing of the button and rotation of the fastening element the two bodies are locked, and all parts in movement are made inaccessible to the user.

Thanks to the presence of the safety switch, effectively actuated in the case of even accidental detachment of the two bodies, the operation of the motor is prevented.

Of course, a man skilled in the art can bring numerous modifications and variants to the engagement system for connecting gardening tools and similar to a power unit described above in order to satisfy contingent and specific requirements, all of which are covered by the scope of protection of the invention, as defined by the following claims.

The invention claimed is:

1. Engagement system (1) for removably connecting gardening tools and similar type devices to a power unit comprising a drive motor, said system comprising a base element (2) suitable for being fixed to a crankcase housing the drive motor, a fastening element (3) of a tool that is actuated by a shaft of said drive motor, the fastening element (3) configured for coupling with the base element (2), said elements (2, 3) comprising respective mutual engagement/disengagement means (5, 6) for cooperating with each other to removably lock said elements (2, 3) in an engagement position, wherein said base element (2) comprises at least one electrical safety switch (19) actuated elastically by a rod (11) between a first position in which the electrical safety switch (19) is closed and prevents the operation of the drive motor, and a second position in which the electrical safety switch (19) is open and allows the operation of the drive motor, said second position only being obtainable when the fastening element (3) is engaged with the base element (2).

2. System (1) according to claim 1, in which said base element (2) comprises a male hollow cylindrical body equipped with a flange (4) for attachment to the crankcase.

3. System (1) according to claim 1, in which said base element (2) is formed in a single piece with the crankcase.

4. System (1) according to claim 1, in which said fastening element (3) comprises a female hollow cylindrical body suitable for at least partially containing the base element (2).

5. System (1) according to claim 1, in which said fastening element (3) is formed in a single piece with the tool.

6. System (1) according to claim 1, in which said engagement/disengagement means comprise a button (5) mounted on the base element (2), said button (5) cooperating with a corresponding opening (6) formed on the fastening element (3) and shaped to receive the button (5) so that the button (5) fits in the opening under a thrust of a spring (7, 9).

7. System (1) according to claim 6, in which said spring is a coil spring (7) arranged radially in a space (8) formed on the base element (2).

8. System (1) according to claim 6, in which said spring is an elastic portion (9) formed cantilevered from the base element (2).

9. System (1) according to claim 1, in which said rod (11) cooperates with an elastic element (14, 15) associated with the base element (2) and is actuated by a ramp (17) of the fastening element (3) when it engages with the base element (2).

10. System (1) according to claim 9, in which said elastic element (14, 15) is loaded through a relative rotation of the fastening element (3) with respect to the base element (2).

11. System (1) according to claim 9, in which said elastic element comprises a spiral spring (14, 15) that acts against said rod (11), and said rod (11) extending transverse to the base element.

12. System (1) according to claim 1, further comprising a coupling system arranged between a guide shaft (30) of the tool and the drive shaft.

13. System (1) according to claim 12, in which said coupling system comprises an engagement cover (20) and a connector (21) centrally associated with said cover (20).

14. System (1) according to claim 13, in which said connector (21) has a shaped seat (23) for receiving the guide shaft (30) of the tool.

* * * * *